May 11, 1965 L. HORNBOSTEL, JR., ETAL 3,183,500
BEARING FAILURE PREDICTING DEVICE
Filed Feb. 15, 1963
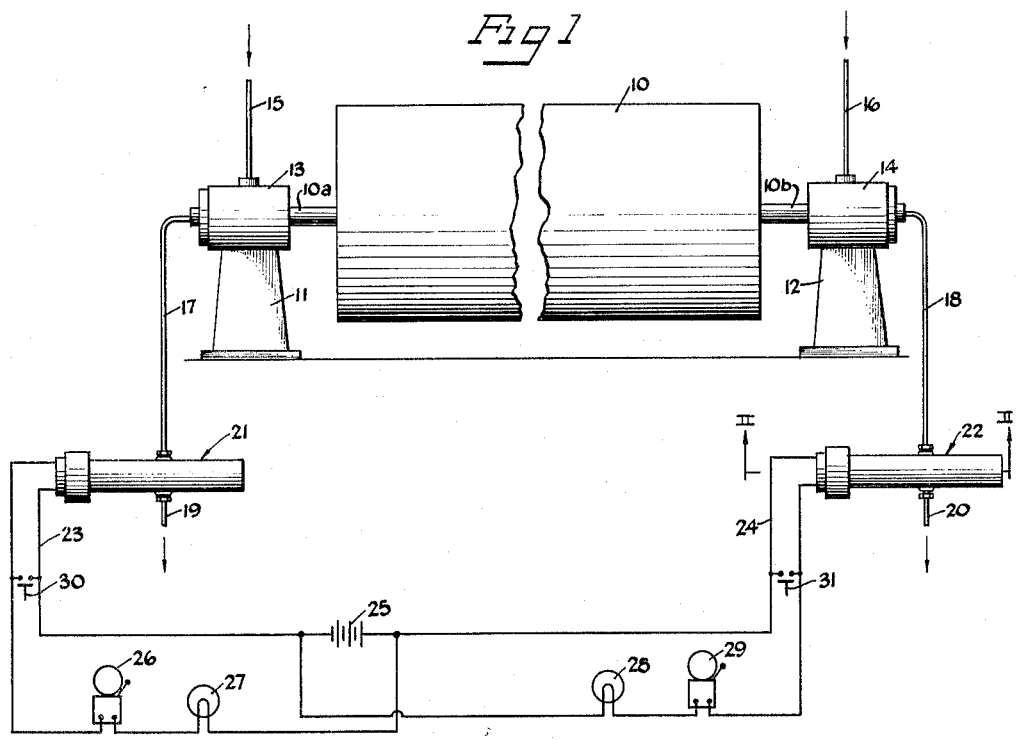
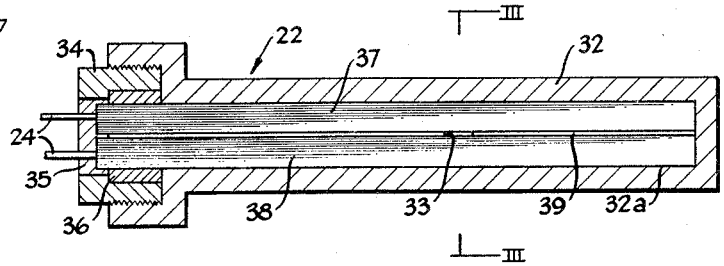
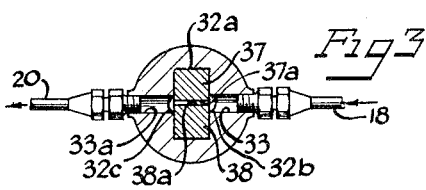
INVENTORS
Lloyd Hornbostel, Jr.
Lawrence B. Ward
BY
ATTORNEYS United States Patent Office 3,183,500
Patented May 11, 1965

3,183,500
BEARING FAILURE PREDICTING DEVICE
Lloyd Hornbostel, Jr., and Lawrence B. Ward, Beloit, Wis., assignors to Beloit Corporation, Beloit, Wis., a corporation of Wisconsin
Filed Feb. 15, 1963, Ser. No. 258,826
5 Claims. (Cl. 340—269)

The present invention relates to an improved mechanism for accurately predicting or indicating when a bearing is approaching failure.

In machinery it is essential that the failure be detected as early as possible for avoiding damage to other parts of the machine such as the bearing housing or the parts supported by the bearing. Early replacement reduces the cost and time of replacement and reduces the shutdown time. This is important in many industries, and, for example, in the papermaking industry failure of a bearing in a drying cylinder if not detected in time may result in the destruction of the bearing housing and the roll journal and damage may occur to the gears driving the cylinder. In addition to the cost of replacing the parts the loss of production due to the shutdown time can be excessive. Early detection will avoid such inconvenience and expense.

It is accordingly an object of the present invention to provide an improved bearing failure detection device which will provide a signal indicating approaching bearing failure with the very first approach of bearing deterioration.

A further object of the invention is to provide an improved bearing failure detection device which accurately and immediately indicates the approach of bearing failure by detecting the release of the first small particle of metal which comes off of the bearing surfaces prior to failure.

A further object of the invention is to provide an improved bearing failure detection device which is inexpensive and relatively simple in construction and operates by a simple attachment in the lubricating flow line connected to a bearing.

It is well recognized that prior to bearing failure small chips of tramp metal are released from the bearing surfaces and carried away by the lubricating oil. A feature of the present invention is the provision of a device capable of detecting the release of a single first particle of metal from a bearing prior to failure and the invention contemplates providing two magnetic probes of opposite polarity formed of electrically conductive material spaced apart to form a narrow flow gap therebetween downstream of the bearing to receive the lubricating fluid with a particle of metal attracted to magnetically bridge the gap between the probe. The probes are connected to an electrical signal circuit so that the particle in bridging the gap will close the circuit and provide a signal indicating approaching bearing failure.

Other objects, advantages and features will become more apparent with the teaching of the principles of the invention in connection with the disclosure of the preferred embodiments thereof in the specification, claims and drawings, in which:

FIGURE 1 is an elevational view with portions in schematic form showing a bearing failure detection device constructed and operating in accordance with the principles of the present invention;

FIGURE 2 is an enlarged detailed sectional view taken substantially along line II—II of FIGURE 1; and FIGURE 3 is a detailed sectional view taken substantially along III—III of FIGURE 2.

On the drawings:

FIGURE 1 illustrates a rotary member such as a dryer cylinder or drum 10 in a paper machine supported on shafts 10a and 10b journaled in bearings 13 and 14. The bearings are supported on columns 11 and 12 and in operation of the machine the cylinder 10 rotates and may be driven in rotation by driving means, not shown, or by frictional contact with the web traveling over its surface.

The bearings 13 and 14 are lubricated by pressure lubrication supply lines 15 and 16 and the lubricant after lubricating the bearings leaves through lines 17 and 18. The lines 15 and 17 form part of the passage for the circulation of lubricant to the lines 16 and 18. With deterioration of either of the bearings 13 or 14 small chips or particles of metal will be released by the bearing surfaces and in accordance with the principles of the present invention detection mechanisms 21 and 22 will detect the release of the first small particle from the bearing.

The detection of the first particle is manifested by operation of a signal mechanism as will be described and the signal mechanism may be utilized in various ways such as by providing an audible and a visual signal and it further can be connected to automatic control devices which will shut down or control the machine so as to accommodate immediate correction for the impending bearing failure.

As illustrated in FIGURE 1, the detecting devices 21 and 22 are connected to leads 23 and 24 which form part of electrical circuits. A power source 25 connects to the circuit, and when the circuit is closed by the detection devices 21 and 22 audible signals 26 and 29 are actuated and visual signals 27 and 28 are also actuated. The circuit is also provided with test switches 30 and 31 which may be closed to check operation of the signal devices.

Other circuit arrangements may be employed wherein after the audible alarms 26 and 29 are actuated they can be deenergized by an "acknowledge" switch which silences the audible signals but permits the visual lights 27 and 28 to remain lit. After the bearing is replaced and the sensing or detection device 21 or 22 cleared, the mechanism can be reset for renewed operation. In the circuit arrangement of FIGURE 1 the mechanism will be ready for renewed operation without resetting, merely requiring clearing of the sensing detection devices 21 or 22.

As will be recognized, a number of individual bearing detection devices may be employed, one for each bearing of the machine each with its own signal so that the operator may immediately determine which bearing is approaching failure.

An important feature of the invention is the capability of the mechanism to detect at a very early time approaching bearing failure by detecting the release of a very small metal chip. This is accomplished by the use of two metal probes 37 and 38 which are spaced to leave a small flow gap 39 between them.

Inasmuch as the detection devices 21 and 22 are of the same construction, only one of the devices 22 will be shown in detail in FIGURES 2 and 3.

The device 22 incorporates a hollow housing 32 with a chamber therein to receive the probes 37 and 38. The probes are mounted on a base 34 for the detector which is threaded to be screwed into the housing 32. This permits removal of the probes for cleaning the gap 39 after a metal particle has been captured.

The probes 37 and 38 are of magnetic material of opposite polarity so that any chip or particle which flows into the passage 39 will align itself in accordance with its longest dimension to span the gap 39 between the probes 37 and 38. The size of the gap 39 will be dictated in accordance with the smallest flake or particle of metal material to be detected and in accordance with the flow space required. However the width of the gap is not limited by the flow space since in accordance with the invention the structure uses elongated probes so that a long gap 39 can be provided of sufficient length to provide a cross sectional area to accommodate the flow of lubricant. The probes are fitted into a cavity 32a within the housing 32 so that all lubricant flow must pass through the gap 39 and therefore any metal particle will immediately be detected.

While the device conventionally will operate in a system using oil as a lubricant, it will be suitable for any lubricant for an anti-friction bearing and can be used in a system using air as a lubricating fluid, for example.

The device may be employed also in any system using a lubricant that flows from the bearing or from any lubricated surface, including gear boxes, differential drives, speed reducers, mechanical variable speed drive mechanisms as well as certain hydraulically driven mechanisms.

As illustrated, the magnetic members or probes 37 and 38 are preferably formed to be rectangular in shape with a square shape being advantageous and can be relatively small in size but are shown enlarged in size for the sake of clarity. This provides facing planar surfaces 37a and 38a to define the gap 39. The lubricating fluid enters through a lateral passage 33 in the housing 32 and after passing through the gap 39 flows out through an outlet passage 33a. Elongated channels 32b and 32c extend along within the chamber 32a ahead and after the gap 39 so that the lubricant will be distributed along the gap from the inlet 33, and will flow from the gap 39 to the outlet passage 33a. The passages are provided with suitable connections such as for connecting to the lines 18 and 20, as illustrated. The chamber 33a within the housing is provided of a size to snugly receive the probes so that lubricant is forced to flow through the gap 39. Elongated square probes of ⅛ inch in diameter for example operate very satisfactorily. The probes are sufficiently coated with a non-corrosive coating on the surfaces impervious to the lubricant flowing through the gap.

The probes 37 and 38 are mounted in an insulator block 36 which is clamped to the housing by the base 34 when it is screwed in place. The insulator block is formed of a magnetic and insulative conducting material. The insulator block may be formed of a fiber or other somewhat resilient insulation to avoid excess vibration between the probes and with long probes a separating insulator spacer may be provided between the ends of the probes opposite the base to maintain the gap 39 and to separate the probes and prevent excess vibration, or a plurality of spacers may be used.

Adjacent the insulator block 36 is an insulator plug 35 which surrounds the electrical leads 24 where they connect to the probes 37 and 38.

The detectors 21 and 22 are shown provided with connections for connecting to the oil circulation lines but the housing 32 may be provided with threads so as to be screwed into a bored and tapped bearing housing with the passages through the detector housing aligned with lubricant flow passages in the bearing housing. This will permit a compact installation capable of receiving the lubricant immediately as it leaves the bearing surface.

In summary, detectors such as 22 are connected in the lubricating fluid flow line 18 downstream of the bearing 14 so that lubricant must flow through the gap 39 between magnetic probes of opposite polarity. The probes are sized and shaped so that no flake of metallic material of such a size as is released by the bearing prior to failure can move out of the bearing housing without bridging the gap 39 between the probes. The particle will be magnetically aligned by the probes of opposite polarity to bridge the gap 39 and complete the circuit formed by the electrically conductive probes. The housing 32 is preferably formed of a magnetically and electrically insulative material although if desired liners may be provided for the chamber 32a within the housing for insulating the probes.

Thus it will be seen that we have provided an improved bearing failure detector which is capable of more rapid detection of failure than devices heretofore available, which meets the objectives and advantages above set forth. The structure is simple in construction and reliable in operation and is capable of simple servicing and testing and will reliably operate over a long operating life without expense or servicing.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a bearing lubrication system,
    a closed housing,
    an elongate narrow chamber in said housing,
    a transverse lubricant inlet passage leading into said chamber,
    a transverse lubricant outlet passage leading from said chamber,
    and opposed walls within said chamber being of opposite magnetic polarity and being electrically insulated with electrical leads connected thereto so that lubricant will flow into said chamber from said inlet passage and flow out through said outlet passage with magnetic particles being retained in the chamber spanning said walls.

2. In a bearing lubrication system,
    a closed housing having an elongate narrow chamber therein,
    a pair of bars of opposite magnetic polarity mounted in the housing and electrically insulated from each other with electrical leads connected thereto forming an elongate narrow flow space between them having an inlet side and an outlet side,
    an elongate inlet chamber on an inlet side of the space extending the full length thereof for distributing lubricant along said space,
    an elongate outlet chamber on the outlet side extending the full length thereof for receiving lubricant flowing from said space,
    an inlet passage in the housing leading to said inlet chamber,
    and an outlet passage in the housing leading from said outlet chamber.

3. A mechanism for positioning in a lubricant flow line for detecting bearing failure by the passage of metal particles comprising,
    a closed housing having an inlet port and an outlet port and adapted for the connection of lubricant supply and drainage lines to said ports,
    an elongate narrow flow space through said housing bounded by bars having opposite magnetic polarity and electrically insulated from each other with electrical terminals connected thereto,
    and a support for said bars of non-magnetic material so that particles flowing through said housing span said bars.

4. In combination with a bearing subject to failure by loss of fragments of metal,
    an oil circulation system for the bearing including a discharge passage,
    means defining an elongate transverse passage in series flow with said discharge passage bounded by inside surfaces of elongate metal bars spaced apart a distance substantially narrower than the width of said discharge passage,
        said bars being of opposite magnetic polarity to attract particles therebetween and being electrically insulated from each other, and
    an electrical circuit in series with said bars and completed by particles spanning the space between the bars.

5. In combination with a bearing subject to failure by loss of fragments of metal,
   an oil circulation system for the bearing including a discharge passage,
   means defining an elongate transverse passage in series flow with said discharge passage bounded by inside surfaces of elongate metal bars spaced apart a distance substantially narrower than the width of said discharge passage,
       said bars being of opposite magnetic polarity to attract particles therebetween and being electrically insulated from each other, said bars being coated with a non-corrosive coating impervious to oil in the system, and
   an electrical circuit in series with said bars and completed by particles spanning the space between the bars.

References Cited by the Examiner
UNITED STATES PATENTS

| | | | |
|---|---|---|---|
| 2,252,222 | 8/41 | Van Os | 340—270 |
| 2,420,177 | 5/47 | Krall | 340—270 |
| 2,462,715 | 2/49 | Booth | 340—270 |
| 3,097,352 | 7/63 | Krasnahiro | 340—270 |

NEIL C. READ, *Primary Examiner.*